United States Patent
Rudolf et al.

(10) Patent No.: US 8,374,190 B2
(45) Date of Patent: Feb. 12, 2013

(54) WIRELESS COMMUNICATION METHOD AND APPARATUS FOR PROVIDING HIGH SPEED DOWNLINK PACKET ACCESS SERVICES

(75) Inventors: Marian Rudolf, Montreal (CA); James M. Miller, Verona, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 733 days.

(21) Appl. No.: 10/806,502

(22) Filed: Mar. 23, 2004

(65) Prior Publication Data

US 2005/0018656 A1 Jan. 27, 2005

Related U.S. Application Data

(60) Provisional application No. 60/458,023, filed on Mar. 26, 2003.

(51) Int. Cl.
*H04J 3/00* (2006.01)
*H04B 7/212* (2006.01)

(52) U.S. Cl. ........ 370/442; 370/336; 370/337; 370/347; 370/348

(58) Field of Classification Search .................. 370/328, 370/278, 280, 281, 458, 31, 35, 342, 332, 370/333, 334, 335, 336, 320, 338, 913, 329, 370/468, 345, 349, 343, 341; 455/522, 69, 455/452.2, 453
See application file for complete search history.

(56) References Cited

U.S. PATENT DOCUMENTS

| | | | |
|---|---|---|---|
| 5,812,545 A * | 9/1998 | Liebowitz et al. | 370/337 |
| 6,490,268 B1 | 12/2002 | Lee et al. | |
| 6,934,268 B1 * | 8/2005 | Hedlund et al. | 370/311 |
| 7,054,633 B2 | 5/2006 | Seo et al. | |
| 7,116,708 B2 * | 10/2006 | Lohtia et al. | 375/225 |
| 7,317,700 B2 * | 1/2008 | Hwang | 370/328 |
| 2001/0028638 A1 | 10/2001 | Walton et al. | |
| 2002/0018453 A1 | 2/2002 | Yu et al. | |
| 2002/0031105 A1 | 3/2002 | Zeira et al. | |
| 2002/0094833 A1 * | 7/2002 | Lieshout et al. | 455/522 |

(Continued)

FOREIGN PATENT DOCUMENTS

| DE | 199 57 299 | 6/2001 |
|---|---|---|
| DE | 19957299 | 6/2001 |

(Continued)

OTHER PUBLICATIONS

3GPP ETSI TS 125 433, V6.0.0, Dec. 2003, Universal Mobile Telecommunications System (UMTS); UTRAN Lub Interface NBAP Signalling (3GPP TS 25.433 Verison 6.0.0 Release 6).

(Continued)

*Primary Examiner* — Ajit Patel
*Assistant Examiner* — Julio Perez
(74) *Attorney, Agent, or Firm* — Volpe and Koenig, P.C.

(57) ABSTRACT

A method and wireless multi-cell communication system for providing high speed downlink packet access (HSDPA) services. The system includes a radio network controller (RNC) in communication with a plurality of base stations. The RNC sends a control signal to at least one base station having a plurality of timeslots, e.g., in a time division duplex (TDD) system and/or frames including transmission timing intervals (TTIs), e.g., in a frequency division duplex (FDD) system assigned thereto for the establishment of HSDPA channels. The control signal indicates a maximum allowed HSDPA transmit power for each of the timeslots and/or TTIs. The base station sends a feedback signal to the RNC indicating the results of measurements of the power of the transmitted HSDPA timeslots and/or TTIs during a predetermined time period.

14 Claims, 3 Drawing Sheets

U.S. PATENT DOCUMENTS

| | | | |
|---|---|---|---|
| 2002/0115460 A1 | 8/2002 | Rune et al. | |
| 2002/0119798 A1 | 8/2002 | Hamabe | |
| 2003/0002462 A1 | 1/2003 | Tanoue | |
| 2003/0021243 A1 | 1/2003 | Hamalainen | |
| 2003/0048764 A1 | 3/2003 | Diep et al. | |
| 2003/0086389 A1* | 5/2003 | Hayashi et al. | 370/328 |
| 2003/0114181 A1* | 6/2003 | Lee et al. | 455/522 |
| 2003/0125069 A1* | 7/2003 | Lee | 455/522 |
| 2003/0210660 A1* | 11/2003 | Wiberg et al. | 370/320 |
| 2003/0235162 A1* | 12/2003 | Chao et al. | 370/329 |
| 2004/0001472 A1* | 1/2004 | Kwak et al. | 370/342 |
| 2004/0009780 A1* | 1/2004 | Dick et al. | 455/509 |
| 2004/0090934 A1* | 5/2004 | Cha et al. | 370/329 |
| 2004/0097253 A1* | 5/2004 | Malkamaki | 455/522 |
| 2004/0102205 A1* | 5/2004 | Zhang et al. | 455/522 |
| 2004/0203476 A1* | 10/2004 | Liu | 455/69 |
| 2004/0224697 A1* | 11/2004 | Hakkinen et al. | 455/450 |
| 2005/0003848 A1* | 1/2005 | Chen et al. | 455/522 |
| 2005/0083977 A1* | 4/2005 | Moulsley et al. | 370/913 |
| 2005/0107106 A1* | 5/2005 | Valkealahti et al. | 455/522 |
| 2005/0117553 A1* | 6/2005 | Wang et al. | 370/338 |
| 2005/0185627 A1* | 8/2005 | Bolgiano et al. | 370/342 |
| 2005/0250540 A1* | 11/2005 | Ishii et al. | 455/561 |
| 2006/0189272 A1* | 8/2006 | Willenegger et al. | 455/3.01 |
| 2006/0198303 A1* | 9/2006 | Iacono et al. | 370/229 |
| 2007/0177555 A1* | 8/2007 | Brueck et al. | 370/338 |
| 2008/0192685 A1 | 8/2008 | Usuda et al. | |

FOREIGN PATENT DOCUMENTS

| | | |
|---|---|---|
| EP | 1 054 518 | 11/2000 |
| EP | 1 341 318 | 3/2003 |
| EP | 1341318 | 3/2003 |
| JP | 2003-009247 | 1/2003 |
| WO | 98/24250 | 6/1998 |
| WO | 98/44754 | 10/1998 |
| WO | 99/52226 | 10/1999 |
| WO | 2005/062550 | 7/2005 |

OTHER PUBLICATIONS

3GPP ETSI TS 125123, V6.0.0, Dec. 2003, Universal Mobile Telecommunications System (UMTS); Requirments for Support of Radio Resource Management (TDD) (3GPP TS 25.123 Version 6.0.0 Release 6).

3GPP, "3rd Generation Partnership Project; Technical Specification Group Radio Access Network; Physical Layer—Measurements (FDD) (Release 4)," 3GPP TS 25.215 V4.70.0, (Jun. 2003).

3GPP ETSI TS 125 433, V5.3.0, Dec. 2002, Universal Mobile Telecommunications System (UMTS); UTRAN Lub Interace NBAP Signalling (3GPP TS 25.433 Version 5.3.0 Release 5).

3GPP, "3rd Generation Partnership Project; Technical Specification Group Radio Access Network; Physical Layer Prodcedures (FDD) (Release 4)," 3GPP TS 25.214 V4.5.0, (Sep. 2002).

3GPP, "3rd eneration Partnership Project; Technical Specification Group Radio Access Network; Physical Layer Procedures (FDD) (Release 5)," 3GPP TS 25.214 V5.3.0, (Dec. 2002).

3GPP, "3rd Generation Partnership Project; Technical Specification Group Radio Access Network; Physical Layer—Measuremnets (FDD) (Release 1999)," 3GPP TS 25.215 V3.11.0, (Sep. 2002).

3GPP TS 25.225 V6.0.0, Dec. 2003, 3rd Generation Partnership Project; Technical Specification Group Radio Access Network; Phyiscal Layer—Measurements (TDD) (Release 6).

3GPP ETSI TS 125 123, V5.3.0, Dec. 2002, Universal Mobile Telecommunications System (UMTS); Requirements for Support of Radio Resource Management (TDD) (3GPP TS 25.123 Version 5.3.0 Release 5).

3GPP ETSI TS 125 123, V5.3.0, Dec. 2002, Universal Mobile Telecommunications System (UMTS); Requiremnets for Support of Radio Resource Management (TDD) (3GPP TS 25.123 Version 5.3.0 Release 5).

3GPP ETSI TS 125 123, V6.0.0, Dec. 2003, Universal Mobile Telecommunications System (UMTS); Requirments for Support of Radio Resource Management (TDD) (3GPP TS 25.123 Version 6.0.0 Release 6).

3GPP, "3rd Generation Partnership Project; Technical Specification Group Radio Access Network; Physical Layer—Measurements (FDD) (Release 4)," 3GPP TS 25.215 V4.6.0, (Dec. 2002).

3GPP ETSI TS 125 123, V5.3.0, Dec. 2002, Universal Mobile Telecommunications System (UMTS); Requirments for Support of Radio Resource Management (TDD) (3GPP TS 25.123 Version 5.3.0 Release 5).

3GPP ETSI TS 125 123, V6.0.0, Dec. 2003, Universal Mobile Telecommunications System (UMTS); Requirements for Support of Radio Resource Management (TDD) (3GPP TS 25.123 Version 6.0.0 Release 6).

3GPP ETSI TS 125 433, V5.3.0, Dec. 2002, Universal Mobile Telecommunications System (UMTS); UTRAN Lub Interface NBAP Signalling (3GPP TS 25.433 Version 5.3.0 Release 5).

3GPP ETSI TS 125 433, V6.0.0, Dec. 2003, Universal Mobile Telecommunications System (UMTS); UTRAN Lub Interface NBAP Signalling (3GPP TS 25.433 Version 6.0.0 Release 6).

3GPP TS 25.225 V5.3.0, Dec. 2002, 3rd Generation Partnership Project; Technical Specification Group Radio Access Network; Physical Layer—Measurements (TDD) (Release 5).

3GPP TS 25.225 V6.0.0, Dec. 2003, 3rd Generation Partnership Project; Technical Specification Group Radio Access Network; Physical Layer—Measurements (TDD) (Release 6).

3GPP TS 25.308, Version 5.4.0, Release 5, Mar. 2003, Technical Specification Group Radio Access Network; High Speed Downlink Packet Access (HSDPA); Stage 2.

3GPP TS 25.321 version 5.4.0, Release 5, Mar. 2003, Technical Specification Group Radio Access Network; Medium Access Control (MAC) Protocol Specification.

3GPP TS 25.321, Version 6.0.0, Release 6, Dec. 2003, Technical Specification Group Radio Access Network; Medium Access Control (MAC) Protocol Specification.

3GPP, 3GPP, "3rd Generation Partnership Project; Technical Specification Group Radio Access Network; UTRAN Iub Interface User Plane Protocols for Common Transport Channel data streams (Release 6)," 3GPP TS 25.435 V6.0.0 (Dec. 2003).

3GPP, "3rd Generation Partnership Project; Technical Specification Group Radio Access Network; Physical Layer Procedures (FDD) (Release 1999)," 3GPP TS 25.214 V3.11.0, (Sep. 2002).

3GPP, "3rd Generation Partnership Project; Technical Specification Group Radio Access Network; Physical Layer Procedures (FDD) (Release 4)," 3GPP TS 25.214 V4.5.0, (Sep. 2002).

3GPP, "3rd Generation Partnership Project; Technical Specification Group Radio Access Network; Physical Layer Procedures (FDD) (Release 4)," 3GPP TS 25.214 V4.6.0, (Mar. 2003).

3GPP, "3rd Generation Partnership Project; Technical Specification Group Radio Access Network; Physical Layer Procedures (FDD) (Release 5)," 3GPP TS 25.214 V5.3.0, (Dec. 2002).

3GPP, "3rd Generation Partnership Project; Technical Specification Group Radio Access Network; Physical Layer Procedures (FDD) (Release 5)," 3GPP TS 25.214 V5.7.0, (Dec. 2003).

3GPP, "3rd Generation Partnership Project; Technical Specification Group Radio Access Network; Physical Layer Procedures (FDD) (Release 6)," 3GPP TS 25.214 V6.0.0, (Dec. 2003).

3GPP, "3rd Generation Partnership Project; Technical Specification Group Radio Access Network; High Speed Downlink Packet Access; Lub/Iur Protocol Aspects (Release 5)," 3GPP TR 25.877 V5.1.0, (Jun. 2002).

3GPP, "3rd Generation Partnership Project; Technical Specification Group Radio Access Network; Physical Layer—Measurements (FDD) (Release 1999)," 3GPP TS 25.215 V3.11.0, (Sep. 2002).

3GPP, "3rd Generation Partnership Project; Technical Specification Group Radio Access Network; Physical Layer—Measurements (FDD) (Release 1999)," 3GPP TS 25.215 V3.12.0, (Jun. 2003).

3GPP, "3rd Generation Partnership Project; Technical Specification Group Radio Access Network; Physical Layer—Measurements (FDD) (Release 4)," 3GPP TS 25.215 V4.6.0m (Dec. 2002).

3GPP, "3rd Generation Partnership Project; Technical Specification Group Radio Access Network; Physical Layer—Measurements (FDD) (Release 4)," 3GPP TS 25.215 V4.7.0, (Jun. 2003).

3GPP, "3rd Generation Partnership Project; Technical Specification Group Radio Access Network; Physical Layer—Measurements (FDD) (Release 5)," 3GPP TS 25.215 V5.2.0, (Dec. 2002).

3GPP, "3rd Generation Partnership Project; Technical Specification Group Radio Access Network; Physical Layer—Measurements (FDD) (Release 5)," 3GPP TS 25.215 V5.5.0, (Sep. 2003).
3GPP, 3rd Generation Partnership Project; Technical Specification Group Radio Access Network; UTRAN Iub Interface NBAP siginalling (Release 1999), 3GPP TS 25.433 V3.14.0 (Sep. 2003).
3GPP, "3rd Generation Partnership Project; Technical Specification Group Radio Access Network; Physical Layer Procedures (TDD) (Release 1999)," 3GPP TS 25.224 V3.12.0 (Dec. 2002).
3GPP, "3rd Generation Partnership Project; Technical Specification Group Radio Access Network; Physical Layer Procedures (TDD) (Release 4)," 3GPP TS 25.224 V4.10.0 (Dec. 2003).
3GPP, "3rd Generation Partnership Project; Technical Specification Group Radio Access Network; Physical layer procedures (TDD) (Release 5)," 3GPP TS 25.224 V5.7.0 (Dec. 2003).
3GPP, 3rd Generation Partnership Project; Technical Specification Group Radio Access Network; Physical layer—Measurements (TDD) (Release 1999), 3GPP TS 25.225 V3.12.0 (Jun. 2003).
3GPP, 3rd Generation Partnership Project; Technical Specification Group Radio Access Network; Physical layer—Measurements (TDD) (Release 4), 3GPP TS 25.225 V4.7.0 (Jun. 2003).
3GPP, "3rd Generation Partnership Project; Technical Specification Group Radio Access Network; Medium Access Control (MAC) protocol specification (Release 1999)," 3GPP TS 25.321 V3.16.0 (Sep. 2003).
3GPP, "3rd Generation Partnership Project; Technical Specification Group Radio Access Network; Medium Access Control (MAC) protocol specification (Release 4)," 3GPP TS 25.321 V4.9.0 (Sep. 2003).
3GPP, "3rd Generation Partnership Project; Technical Specification Group Radio Access Network; Medium Access Control (MAC) protocol specification (Release 5)," 3GPP TS 25.321 V5.7.0 (Dec. 2003).
3GPP, "3rd Generation Partnership Project; Technical Specification Group Radio Access Network; Requirements for support of radio resource management (TDD) (Release 1999)," 3GPP TS 25.123 V3.11.0 (Sep. 2002).
3GPP, "3rd Generation Partnership Project; Technical Specification Group Radio Access Network; Requirements for support of radio resource management (TDD) (Release 1999)," 3GPP TS 25.123 V3.14.0 (Dec. 2003).
3GPP, "3rd Generation Partnership Project; Technical Specification Group Radio Access Network; Requirements for support of radio resource management (TDD) (Release 5)," 3GPP TS 25.123 V5.7.0 (Dec. 2003).
3GPP, "3rd Generation Partnership Project; Technical Specification Group Radio Access Network; Requirements for support of radio resource management (TDD) (Release 4)," 3GPP TS 25.123 V4.11.0 (Dec. 2003).
3GPP, "3rd Generation Partnership Project; Technical Specification Group Radio Access Network; Requirements for Support of Radio Resource Management (TDD) (Release 4)," 3GPP TS 25.123 V4.7.0 (Dec. 2002).
3GPP, "3rd Generation Partnership Project; Technical Specification Group Radio Access Network; Physical layer procedures (FDD) (Release 1999)," 3GPP TS 25.214 V3.12.0 (Mar. 2003).
3GPP, "3rd Generation Partnership Project; Technical Specification Group Radio Access Network; Physical layer—Measurements (FDD) (Release 6)," 3GPP TS 25.215 V6.0.0 (Dec. 2003).
3GPP, "3rd Generation Partnership Project; Technical Specification Group Radio Access Network; UTRAN Iub Interface User Plane Protocols for Common Transport Channel Data Streams (Release 1999)," 3GPP TS 25.435 V3.11.0 (Dec. 2003).
3GPP, "3rd Generation Partnership Project; Technical Specification Group Radio Access Network; Physical channels and mapping of transport channels onto physical channels (TDD) (Release 5)," 3GPP TS 25.221 V5.3.0 (Dec. 2002).
3GPP, "3rd Generation Partnership Project; Technical Specification Group Radio Access Network; UTRAN Iub interface NBAP signalling (Release 4)," 3GPP TS 25.433 V4.11.0 (Dec. 2003).
3GPP, "3rd Generation Partnership Project; Technical Specification Group Radio Access Network; Physical channels and mapping of transport channels onto physical channels (TDD) (Release 6)," 3GPP TS 25.221 V6.0.0 (Dec. 2003).
3GPP, "3rd Generation Partnership Project; Technical Specification Group Radio Access Network; Physical layer—Measurements (TDD) (Release 5)," 3GPP TS 25.225 V5.6.0 (Dec. 2003).

3GPP, "3rd Generation Partnership Project; Technical Specification Group Radio Access Network; Physical layer—Measurements (TDD) (Release 199)," 3GPP TS 25.225 V3.11.0 (Sep. 2020).
3GPP, "3rd Generation Partnership Project; Technical Specification Group Radio Access Network; Physical channels and mapping of transport channels onto physical channels (TDD) (Release 5)," 3GPP TS 25.221 V5.5.0 (Jun. 2003).
3GPP, "3rd Generation Partnership Project; Technical Specification Group Radio Access Network; Physical channels and mapping of transport channels onto physical channels (TDD) (Release 1999)," 3GPP TS 25.221 V3.11.0 (Sep. 2002).
3GPP, "3rd Generation Partnership Project; Technical Specification Group Radio Access Network; Physical Layer Procedures (TDD) (Release 4)," 3GPP TS 25.224 V4.7.0 (Dec. 2002).
3GPP, "3rd Generation Partnership Project; Technical Specification Group Radio Access Network; Physical Layer Procedures (TDD) (Release 5)," 3GPP TS 25.224 V5.3.0 (Dec. 2002).
3GPP, "3rd Generation Partnership Project; Technical Specification Group Radio Access Network; Physical layer procedures (TDD) (Release 6)," 3GPP TS 25.224 V6.0.0 (Dec. 2003).
3GPP, "3rd Generation Partnership Project; Technical Specification Group Radio Access Network; Physical channels and mapping of transport channels onto physical channels (TDD) (Release 4)," 3GPP TS 25.221 V4.7.0 (Dec. 2002).
3GPP, "3rd Generation Partnership Project; Technical Specification Group Radio Access Network; Physical Layer Procedures (TDD) (Release 1999)," 3GPP TS 25.224 V3.13.0 (Sep. 2003).
3GPP, "3rd Generation Partnership Project; Technical Specification Group Radio Access Network; UTRAN Iub interface NBAP signalling (Release 4)," 3GPP TS 25.433 V4.7.0 (Dec. 2002).
3GPP, "3rd Generation Partnership Project; Technical Specification Group Radio Access Network; UTRAN Iub interface NBAP signalling (Release 5)," 3GPP TS 25.433 V5.7.0 (Dec. 2003).
3GPP, "3rd Generation Partnership Project; Technical Specification Group Radio Access Network; UTRAN Iub Interface User Plane Protocols for Common Transport Channel data streams (Release 5)," 3GPP TS 25.435 V5.6.0 (Dec. 2003).
3GPP, "3rd Generation Partnership Project; Technical Specification Group Radio Access Network; Physical layer—Measurements (TDD) (Release 4)," 3GPP TS 25.225 V4.6.0 (Dec. 2002).
3GPP, "3rd Generation Partnership Project; Technical Specification Group Radio Access Network; Medium Access Control (MAC) protocol specification (Release 1999)," 3GPP TS 25.321 V3.15.0 (Mar. 2003).
3GPP, "3rd Generation Partnership Project; Technical Specification Group Radio Access Network; UTRAN Iub Interface User Plane Protocols for Common Transport Channel Data Streams (Release 1999)," 3GPP TS 25.435 V3.10.0 (Mar. 2002).
3GPP, "3rd Generation Partnership Project; Technical Specification Group Radio Access Network; UTRAN Iub Interface User Plane Protocols for Common Transport Channel data streams (Release 5)," 3GPP TS 25.435 V5.4.0 (Mar. 2003).
3GPP, "3rd Generation Partnership Project; Technical Specification Group Radio Access Network; Medium Access Control (MAC) protocol specification (Release 4)," 3GPP TS 25.321 V4.8.0 (Mar. 2008).
3GPP, "3rd Generation Partnership Project; Technical Specification Group Radio Access Network; UTRAN Iub interface user plane protocols for Common Transport Channel data streams (Release 4)," 3GPP TS 25.435 V4.5.0 (Sep. 2002).
3GPP, "3rd Generation Partnership Project; Technical Specification Group Radio Access Network; UTRAN Iub interface NBAP signaling (Release 1999)," 3GPP TS 25.433 V3.12.0 (Dec. 2002).
3GPP, "3rd Generation Partnership Project; Technical Specification Group Radio Access Network; UTRAN Iub interface user plane protocols for Common Transport Channel data streams (Release 4)," 3GPP TS 25.435 V4.6.0 (Dec. 2003).
3GPP, TS 25.308 version 6.0.0, Release 6, Dec. 2003, Technical Specification Group Radio Access Network; High Speed Downlink Packet Access (HSDPA); Stage 2.
3GPP, TS 25.435 version 5.3.0, Release 5, Dec. 2002, Universal Mobile Telecommunications System (UMTS); UTRAN Lub Interface User Plane Protocols for CCH Data Streams.

* cited by examiner

WIRELESS COMMUNICATION METHOD AND APPARATUS FOR PROVIDING HIGH SPEED DOWNLINK PACKET ACCESS SERVICES

CROSS REFERENCE TO RELATED APPLICATION

This application claims priority from U.S. Provisional Patent Application Ser. No. 60/458,023, filed Mar. 26, 2003, which is incorporated by reference as if fully set forth herein.

FIELD OF THE INVENTION

The present invention generally relates to a wireless multi-cell communication system. More particularly, the present invention relates to controlling the transmission power used by base stations when providing high speed downlink packet access (HSDPA) services.

BACKGROUND

The third generation partnership project (3GPP) wideband code division multiple access (W-CDMA) system is outlined in the operational scenarios for universal mobile telecommunications system (UMTS) releases R99/R4 and R5. Release 5 of the UMTS frequency division duplex (FDD) and time division duplex (TDD) modes have incorporated a feature called high speed downlink packet access (HSDPA) for improving throughput, latency and spectral efficiency in the downlink (DL). The principle of HSDPA is to schedule packet transmissions on the air interface to different mobiles as a function of their instantaneous experienced radio and service conditions in a dynamic manner (i.e., fast, every 2 ms in FDD or every 10 ms in wideband TDD, for example). The key functionalities of HSDPA in both FDD and TDD modes are (i) fast re-transmissions (Hybrid ARQ) of DL packets received in error over the air interface (Uu), (ii) fast uplink (UL) notification of DL packets received in error (Acknowledgements/Negative Acknowledgements), (iii) fast channel feedback in the UL on the DL channel state of a wireless transmit/receive unit (WTRU), and (iv) fat-pipe scheduling for efficiently servicing many users in the DL. This functionality, i.e., the fast, dynamic HSDPA packet scheduler, is located in the base station (i.e., the Node B) and operates in a rather autonomous manner from the radio network controller (RNC).

The RNC in a UMTS network has responsibility for network control and radio resource management (RRM). The RNC performs tasks such as, for example, user admission control and interference management using dynamic channel allocation (DCA) algorithms, and is thus key to ensuring reliable system operation and maximizing system efficiency. One measure of high efficiency is when the users are served or when the overall throughput is achieved.

In an FDD system, the RNC allocates a certain number of spreading codes for the usage of HSDPA data channels (HS-DSCHs) to each cell. Furthermore, in the FDD system, the HS-DSCH is transmitted over an HS transmission timing interval (TTI) length of 3 consecutive timeslots (3*0.66 ms=2 ms). The RNC communicates with the base station, noting that the spreading codes can be used for HSDPA by means of Iub/Iur signaling, and subsequently passes control on when to send DL packets in these codes to the base station. The RNC also notifies the WTRU by means of RRC signaling regarding which physical channels to listen for the HSDPA control channels, i.e., high speed shared control channels (HS-SCCHs), which in turn are used by the base station to dynamically notify WTRUs of the arrival of scheduled DL packets on its HS-DSCH. Also, the same information is sent from the RNC to base station, such that the base station is informed regarding which HS-SCCH channel a WTRU is to be alerted when HSDPA data is to be sent to the WTRU. Furthermore, the base station acts on an independent basis to determine, based on its own HSDPA scheduler, when to transmit HSDPA data to a particular WTRU.

In a TDD system, the RNC allocates a certain number of timeslots (TSs) for the usage of HSDPA data channels (HS-DSCHs) to each cell. The RNC communicates with the base station, noting that the TSs and spreading codes can be used for HSDPA by means of Iub/Iur signaling, and subsequently passes control on when to send DL packets in these TSs and codes to the base station. The RNC also notifies the WTRU by means of RRC signaling regarding which physical channels to listen for the HSDPA control channels, (i.e., high speed shared control channels (HS-SCCHs)), which in turn are used by the base station to dynamically notify WTRUs of the arrival of scheduled DL packets on its HS-DSCH. Also, the same information is sent from the RNC to base station, such that the base station is informed regarding which HS-SCCH channel a WTRU is to be alerted when HSDPA data is to be sent to the WTRU. Furthermore, the base station acts on an independent basis to determine, based on its own HSDPA scheduler, when to transmit HSDPA data to a particular WTRU.

In any CDMA system, efficient management of the resource "power" is key to keeping interference low and to maximizing the system capacity, (i.e., the number of simultaneously supported users and overall data throughput for all cells in an area).

For interference management, both FDD and TDD employ fast closed-loop (CL) power-control (PC) in the DL for the dedicated channels. Furthermore for the most common case of FDD and TDD conventional Release 99, 4 and 5 (R99, R4 and R5) dedicated channels (DCHs), CL PC operates within RNC controlled power limits. Thus, a dynamic range is pre-established at DCH setup and eventually adjusted during the life-time of the DCH by the RNC. The Node B is signaled the PC dynamic range by the RNC in the form of a maximum Tx power not to be exceeded and a minimum Tx power to be maintained because the RNC must make complex decisions to enhance the system performance. For example, a WTRU, requiring too much power, and thus frequently attaining the upper limit of the allowed dynamic range, creates over-proportional interference levels to other users in the system. The RNC may want to drop or to handover this WTRU's connection. Therefore, tight RNC control of power limits while still allowing autonomous base station operation within the established power limits is a key feature in a CDMA system operating with power-control.

For common channels of both TDD and FDD systems, tight control over the possible power settings is essential to ensuring that adequate coverage and service is available.

In R5, much more autonomy is given to the base station as compared to R99 and R4. In particular, the HS-DSCH is scheduled and sent solely under Node B responsibility. The RNC still retains semi-static control by signaling both the WTRU and the base station with spreading codes and TSs, which are to be used for the HSDPA service, and ensuring that control channels (HS-SCCH) and high speed shared information channels (HS-SICH) are used. Once this framework has been laid out, control is completely passed on to the base station, which schedules DL packet transmissions on its own.

In FDD applications, the RNC allocates in a semi-static manner a maximum amount of DL power, as a fraction of the total available base station Tx DL power, for the HSDPA service not to be exceeded in order to maintain the relatively high-level of interference created by the HSDPA channels within reasonable limits. This is implemented by signaling over the RNC/base station interfaces (Iub) when configuring DL channels in the base station. Otherwise, an HSDPA WTRU at a cell border could eventually be served by the Node B at a high HSDPA data rate and create such a high level of interference that any service in the neighboring cells would be heavily impacted, even adversely, and result in an unacceptable degradation of overall system capacity or service to non-HSDPA (R99 and R4) WTRUs. The RNC set maximum HSDPA power fraction per cell in turn indirectly determines the maximum data rate with which any given WTRU can be serviced. Another reason for the existence of such a control mechanism is that a certain amount of Node B DL Tx power needs to be reserved for non-HSDPA channels, such as pilot channels, common control channels or non-HSDPA DCHs.

A method and system for using an RNC control mechanism to establish a maximum HSDPA power level for each cell to provide HSDPA services does not exist for TDD. The only way to mitigate this at all is to dedicate certain timeslots to HS-DSCH and others timeslots to the other existing services (dedicated, shared, etc.). However, this does not allow the system to optimize the resource/power use of the WTRU by minimizing the timeslots a WTRU needs for handling the HS-DSCH channel along with the supporting channels (HS-SCCH or associated dedicated channels), since these channels cannot exist in common timeslots. This lack of RNC control is a clear drawback for reliable R5 TDD system operation and multi-cellular deployment of HSDPA enabled TDD systems in coexistence with R99/R4 non-HSDPA WTRUs and even potentially within the HSDPA WTRU itself when it needs to efficiently use the HS-DSCH along with dedicated and other control channels.

The maximum allowed Node B Tx power is configurable at cell setup by the RNC, but it does not discriminate between a base station's timeslots and applies to all of them. Furthermore, it does not differentiate between non-HSDPA and HSDPA channels.

It is desirable to have a signaling mechanism between the RNC and a plurality of base stations to provide HSDPA services without experiencing the disadvantages of known arrangements.

SUMMARY

A method and wireless multi-cell communication system for providing high speed downlink packet access (HSDPA) services. The system includes a radio network controller (RNC) in communication with a plurality of base stations. The RNC sends a control signal to at least one base station having a plurality of timeslots, e.g., in a time division duplex (TDD) system and/or frames including transmission timing intervals (TTIs), e.g., in a frequency division duplex (FDD) system assigned thereto for the establishment of HSDPA channels. The control signal indicates a maximum allowed HSDPA transmit power for each of the timeslots and/or TTIs. The base station sends a feedback signal to the RNC indicating the results of measurements of the power of the transmitted HSDPA timeslots and/or TTIs during a predetermined time period.

BRIEF DESCRIPTION OF THE DRAWING(S)

A more detailed understanding of the invention may be had from the following description of preferred embodiments, given by way of example and to be understood in conjunction with the accompanying drawings wherein.

DETAILED DESCRIPTION OF THE PREFERRED EMBODIMENT(S)

Figure 1:
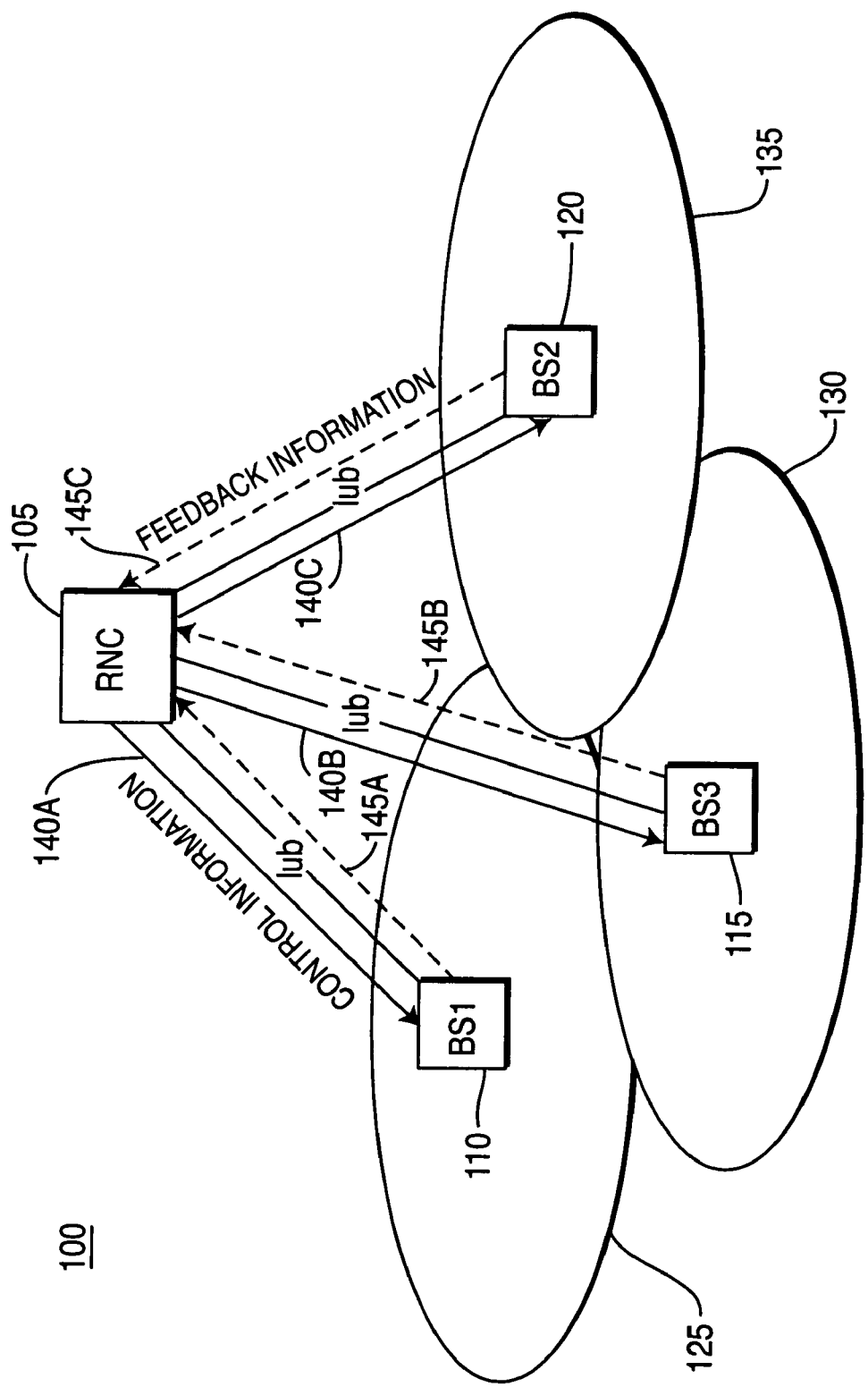
FIG. 1 shows a wireless multi-cell communication system for providing HSDPA services in accordance with the present invention.

The present invention will be described with reference to the drawing figures wherein like numerals represents like elements.

Although the present invention has been described in conjunction with TDD and FDD type wireless communication systems, it is important to note that the present invention may be implemented in any type of wireless communication system including TD-SCDMA and CDMA 2000.

The communications link is typically established using a wireless transmit/receive unit (WTRU). A WTRU includes but is not limited to a user equipment, mobile station, fixed or mobile subscriber unit, pager, or any other type of device capable of operating in a wireless environment. These exemplary types of wireless environments include, but are not limited to, wireless local area networks and public land mobile networks. The WTRUs described herein are capable of operating in a time slotted mode or a frequency divided mode such as TDD and FDD respectively. A "base station" includes but is not limited to a Node B, site controller, access point or other interfacing device in a wireless environment.

FIG. 1 shows a wireless multi-cell communication system 100 which provides HSDPA services in accordance with the present invention. The system 100 includes a radio network controller (RNC) 105 and a plurality of base stations 110, 115, 120, operating in respective cells 125, 130 and 135. The RNC 105 sends a control signal 140A, 140B, 140C, to at least one of the base stations 110, 115, 120, the at least one base station having a plurality of timeslots assigned thereto for the establishment of HSDPA channels, and the control signal 140A, 140B, 140C, indicating a maximum allowed HSDPA transmit power for each of the timeslots. The at least one base station 110, 115, 120, sends a feedback signal 145A, 145B, 145C, to the RNC 105, the feedback signal 145A, 145B, 145C, indicating the results of measurements of the power of the transmitted HSDPA timeslots during a predetermined time period. The system 100 may be a TDD system which uses an existing Iub interface whereby some or all of the cells/sectors in a deployment area of the system 100 offer the possibility of HSDPA service.

In the system 100, the RNC 105 communicates with individual base stations 110, 115, 120, and on a per timeslot basis control information on the maximum allowed HSDPA TS transmit (Tx) power not to be exceeded for a base station's 110, 115, 120, individual HS-DSCH timeslots. The maximum allowed HSDPA TS Tx power may be set to different values for different HSDPA TSs of a particular cell. Also, if the same TS is enabled for HSDPA service in different cells, different maximum allowed HSDPA TS Tx power levels are configurable for the respective cells. For example, the cell 125 may not be allowed to exceed 5 dBm in $TS_m$ for its HSDPA service, whereas the cell 130 may not exceed 25 dBm for its HSDPA service in this same $TS_m$.

Figure 2A:
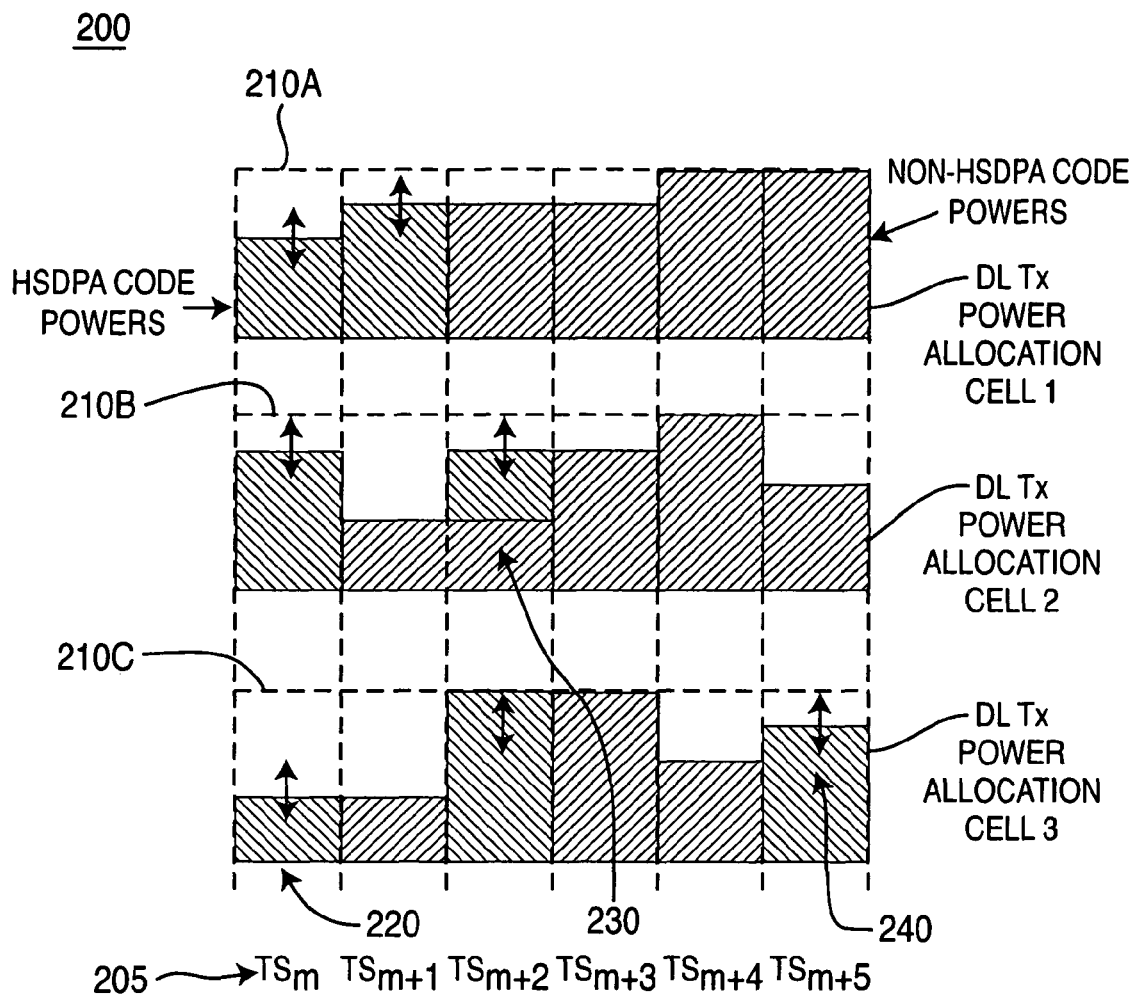
FIG. 2A illustrates downlink transmission power allocation in cells based on time slots transmitted by a TDD system in accordance with one embodiment of the present invention.

FIG. 2A illustrates an exemplary HSDPA TS configuration 200 whereby various HSDPA power settings used by the RNC 105 for each of a plurality of timeslots 205, (consisting of timeslots $TS_m$, $TS_{m+1}$, $TS_{m+2}$, $TS_{m+3}$, $TS_{m+4}$, $TS_{m+5}$), for each of a plurality of cells 125, 130, 135. The maximum possible radio frequency (RF) base station power level for each cell and respective timeslot is depicted by dotted lines 210A, 210B and 210C, respectively.

FIG. 2A illustrates three different allocation scenarios 220, 230, 240 for TDD timeslots that can occur. The set of timeslots per frame allocated to HSDPA service in a TDD may be different from cell to cell.

For scenario 220, multiple cells provide HSDPA service in the same TS whereby maximum power settings are established to guarantee sufficient coverage for each TS. Scenario 220 maximizes system-wide HSDPA throughput.

For scenario 230, the TSs are used by multiple cells for non-HS channels to, for example, guarantee sufficient coverage for the common channels. Scenario 230 ensures simultaneous support of non-HSDPA channels in the same TS.

For the scenario 240, cell 1 is for providing HSDPA service and cell 2 uses R99 channels in the same TS. The maximum power setting is established to protect R99 channels and guarantee sufficient coverage for the TS in cell 1. Scenario 240 ensures simultaneous support of non-HSDPA channels in the same TS in neighboring cells.

The control information from the RNC 105 with these maximum allowed HSDPA TS Tx power settings to the cells 125, 130, 135, can be communicated at setup of the HSDPA resource pool in the particular base station 110, 115, 120, along with the information of which TSs and spreading codes are available to the base station for use with a HSDPA resource pool setup sent from the RNC 105 to the base stations. It shall also be possible to adjust the value of the maximum allowed HSDPA TS Tx power setting during the lifetime of the HSDPA resource pool of a given base station.

The individual base station 110, 115, 120, can communicate to the RNC 105 feedback information 145A, 145B, 145C, advantageously realized, but not exclusively restricted to, in the form of measurements such as the effectively transmitted HSDPA TS Tx power observed during a given time period, (for example 100 ms or longer). This provides feedback to the radio resource management (RRM) algorithms residing in the RNC 105 about the efficiency of these HSDPA power allocations and assists in the decision making process.

One or more RRM algorithms, such as slow/fast-DCA, congestion/link control or others, residing in the RNC 105 take advantage of their knowledge of used Tx power/interference levels, (originating from HSDPA and non-HSDPA channels), observed by WTRUs (not shown) and base stations 110, 115, 120, in the system 100 to maximize system throughput or user capacity for HSDPA service or non-HSDPA service in the presence of HSDPA in one or more cells 125, 130, 135.

The maximum allowed HSDPA TS Tx power should ideally correspond to the maximum allowed sum of individual code powers of all spreading codes in the same TS allowed to be used on a cell HS-DSCH. Equivalent forms of signaling this may exist, but will still be functionally the same in principle.

The feedback information 145A, 145B, 145C, sent from the base stations 110, 115, 120, to the RNC 105 should ideally correspond to measurements on the effectively transmitted power on the sum of individual code powers of all spreading codes in the same TS, averaged over a certain reporting period. Other functionally equivalent measurements or feedback may also exist.

In an FDD system, the allowed power for HSDPA service in the DL is settable by the RNC on a per cell basis only. There is no difference in "time domain." Thus, for a given FDD cell, the very same power setting applies for all TTIs used to execute the HSDPA service.

Figure 2B:
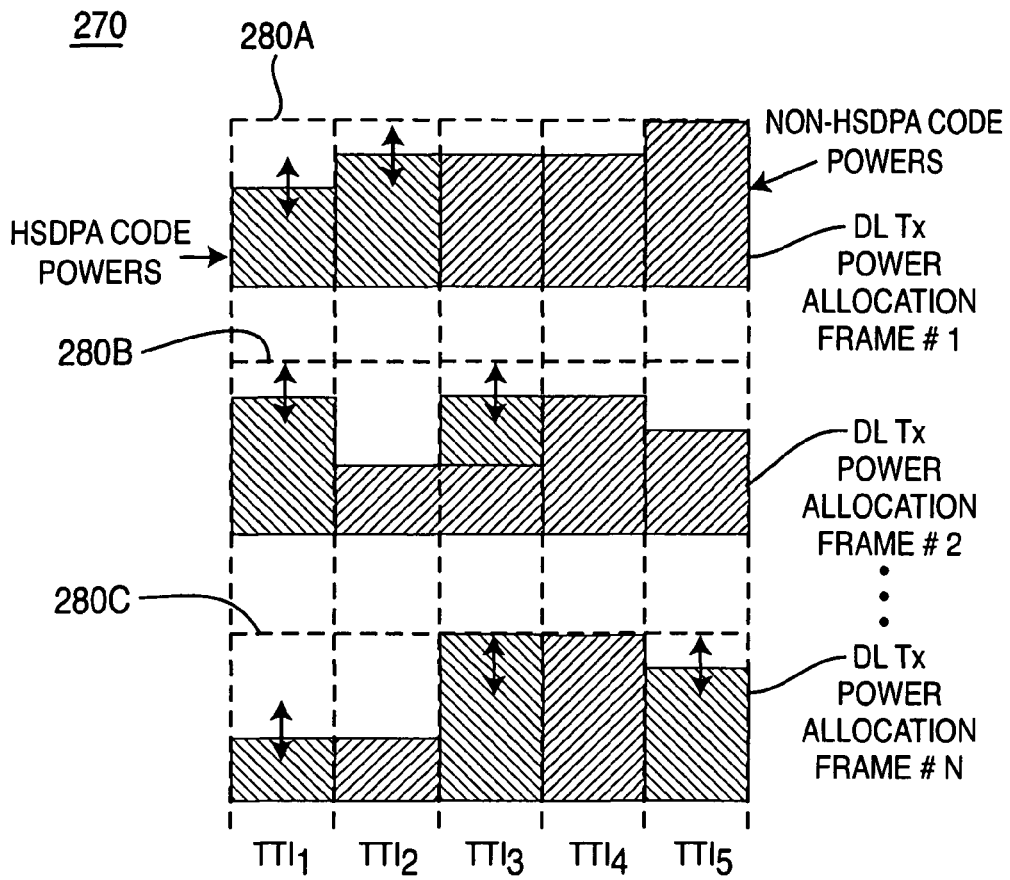
FIG. 2B illustrates downlink transmission power allocation in cells based on HS transmission timing intervals transmitted by an FDD system in accordance with one embodiment of the present invention.

FIG. 2B illustrates an exemplary FDD HSDPA system configuration 270 whereby various HSDPA power settings used by the RNC 105 for each of a plurality of frames (e.g., each 10 ms long) include five TTIs ($TTI_1$-$TTI_5$), for each of a plurality of cells 125, 130, 135, each of the TTIs being 2 ms long. The maximum possible radio frequency (RF) base station power level for each cell and respective TTI is depicted by dotted lines 280A, 280B and 280C, respectively.

In accordance with one embodiment, different FDD TTIs in a cell are allocated different max Tx power settings. Furthermore, different sets of FDD HS-TTIs in a cell are allocated different max Tx power settings. For example, all of the 5 HS TTI's in frame n share a common maximum power setting, but the 5 HS-TTIs in the next following frame n+1 are assigned a different maximum power setting.

The RNC is able to totally shut off one or more HS TTIs in a cell. For example, a cell may be configured not to transmit HSDPA in frame n, frame n+4, frame n+8, etc., but may be allowed to transmit in the other frames to maintain interference management and coverage extension.

Figure 3:
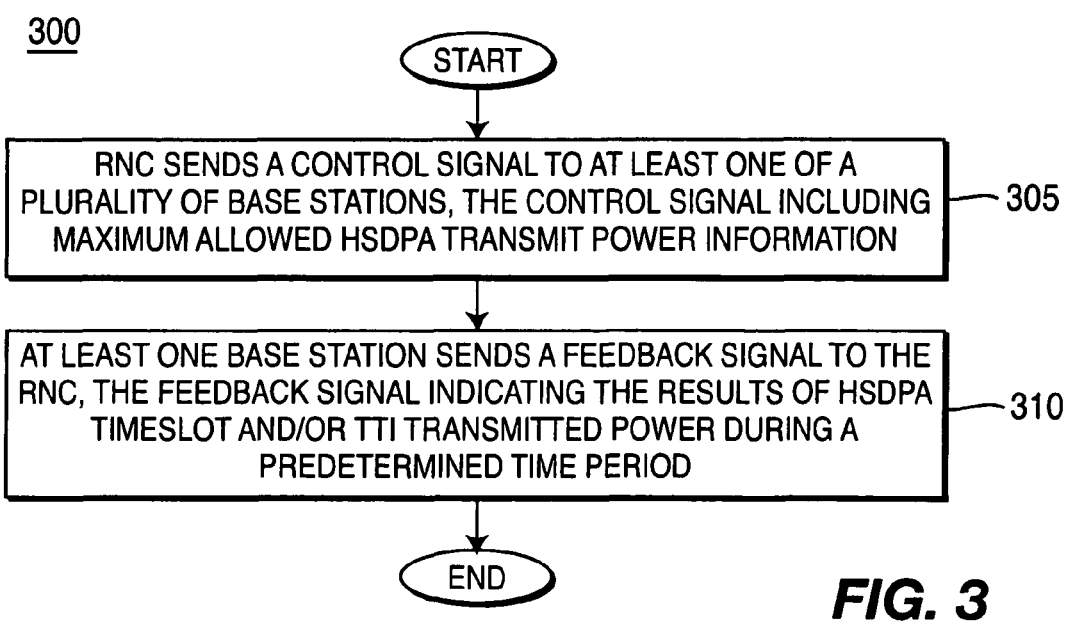
FIG. 3 is a flow chart including method steps used by the system of FIG. 1 to provide HSDPA services.

FIG. 3 is a flow chart of a process 300 including method steps used by the system 100 to provide HSDPA services. In step 305, the RNC 105 sends a control signal 140A, 140B, 140C, to at least one of the base stations 110, 115, 120, the at least one base station being associated with a plurality of timeslots and the control signal 140A, 140B, 140C, indicating a maximum allowed HSDPA transmit power for each of the timeslots. In step 310, the at least one base station 110, 115, 120, sends a feedback signal 145A, 145B, 145C to the RNC 105 indicating the results of measurements of the power of the transmitted HSDPA timeslots during a predetermined time period.

The foregoing is a description of an exemplary embodiment of a signaling system between the RNC 105 and base stations 110, 115, 120, using the principles of the invention. While this invention has been particularly shown and described with reference to preferred embodiments, it will be understood by those skilled in the art that various changes in form and details may be made therein without departing from the scope of the invention as described above.

What is claimed is:

1. A Node B comprising:
circuitry configured to receive a first Iub signal from a radio network controller (RNC) indicating a maximum transmit power level for all channel codes transmitted by the Node B; wherein the circuitry is further configured to receive a second Iub signal from the RNC indicating a maximum transmit power level for high speed downlink shared channel (HS-DSCH) and high speed shared control channel (HS-SCCH) codes of the Node B for each time slot of a plurality of time slots in a time division duplex frame; wherein the circuitry is further configured to transmit at least the HS-DSCH and HS-SCCH codes in each slot at a power level that does not exceed the maximum transmit power level for HS-DSCH and HS-SCCH codes of the Node B; and wherein the circuitry is further configured to transmit an Iub signal to the RNC indicating a transmit power associated with wireless transmit/receive units (WTRUs) of the Node B.

2. The Node B of claim 1 wherein the circuitry is further configured to schedule HS-DSCH transmissions to wireless transmit/receive units (WTRUs).

3. The Node B of claim 1 wherein the second Iub signal is associated with a channel configuration.

4. A Node B comprising:
circuitry configured to receive a first Iub signal from a radio network controller (RNC) indicating a maximum transmit power level for all channel codes transmitted by the Node B; wherein the circuitry is further configured to receive a second Iub signal from the RNC indicating a maximum transmit power level for high speed downlink shared channel (HS-DSCH) and high speed shared control channel (HS-SCCH) codes of the Node B for each time slot of a plurality of time slots in a time division duplex frame; wherein the circuitry is further configured to transmit at least the HS-DSCH and HS-SCCH codes in each slot at a power level that does not exceed the maximum transmit power level for HS-DSCH and HS-SCCH codes of the Node B; and wherein the circuitry is further configured to receive an Iub signal from the RNC indicating a number of codes for HS-DSCH transmission.

5. A radio network controller (RNC) comprising:
circuitry configured to transmit a first Iub signal to a Node B indicating a maximum transmit power level for all channel codes transmitted by the Node B; wherein the circuitry is further configured to transmit a second Iub signal to the Node B indicating a maximum transmit power level for high speed downlink shared channel (HS-DSCH) and high speed shared control channel (HS-SCCH) codes of the Node B for each time slot of a plurality of time slots in a time division duplex frame; and the circuitry is further configured to receive an Iub signal from the Node B indicating a transmit power associated with wireless transmit/receive units (WTRUs) of the Node B.

6. The RNC of claim 5 wherein the second Iub signal is associated with a channel configuration.

7. A radio network controller (RNC) comprising:
circuitry configured to transmit a first Iub signal to a Node B indicating a maximum transmit power level for all channel codes transmitted by the Node B; wherein the circuitry is further configured to transmit a second Iub signal to the Node B indicating a maximum transmit power level for high speed downlink shared channel (HS-DSCH) and high speed shared control channel (HS-SCCH) codes of the Node B for each time slot of a plurality of time slots in a time division duplex frame; and wherein the circuitry is further configured to transmit an Iub signal to the Node B indicating a number of codes for HS-DSCH transmission.

8. A method, performed by a Node B, of providing high speed downlink packet access (HSDPA) services, the method comprising:
receiving a first Iub signal from a radio network controller (RNC) indicating a maximum transmit power level for all channel codes transmitted by the Node B;
receiving a second Iub signal from the RNC indicating a maximum transmit power level for high speed downlink shared channel (HS-DSCH) and high speed shared control channel (HS-SCCH) codes of the Node B for each time slot of a plurality of time slots in a time division duplex frame;
transmitting at least the HS-DSCH and HS-SCCH codes in each slot at a power level that does not exceed the maximum transmit power level for HS-DSCH and HS-SCCH codes of the Node B; and
transmitting an Iub signal to the RNC indicating a transmit power associated with wireless transmit/receive units (WTRUs) of the Node B.

9. The method of claim 8 further comprising:
scheduling HS-DSCH transmissions to wireless transmit/receive units (WTRUs).

10. The method of claim 8 wherein the second Iub signal is associated with a channel configuration.

11. A method, performed by a Node B, of providing high speed downlink packet access (HSDPA) services, the method comprising:
receiving a first Iub signal from a radio network controller (RNC) indicating a maximum transmit power level for all channel codes transmitted by the Node B;
receiving a second Iub signal from the RNC indicating a maximum transmit power level for high speed downlink shared channel (HS-DSCH) and high speed shared control channel (HS-SCCH) codes of the Node B for each time slot of a plurality of time slots in a time division duplex frame;
transmitting at least the HS-DSCH and HS-SCCH codes in each slot at a power level that does not exceed the maximum transmit power level for HS-DSCH and HS-SCCH codes of the Node B; and
receiving an Iub signal from the RNC indicating a number of codes for HS-DSCH transmission.

12. A method, performed by a radio network controller (RNC), of providing high speed downlink packet access (HSDPA) services, the method comprising:
transmitting a first Iub signal to a Node B indicating a maximum transmit power level for all channel codes transmitted by the Node B;
transmitting a second Iub signal to the Node B indicating a maximum transmit power level for high speed downlink shared channel (HS-DSCH) and high speed shared control channel (HS-SCCH) codes of the Node B for each time slot of a plurality of time slots in a time division duplex frame; and
receiving an Iub signal by the RNC from the Node B indicating a transmit power associated with wireless transmit/receive units (WTRUs) of the Node B.

13. The method of claim 12 wherein the second Iub signal is associated with a channel configuration.

14. A method, performed by a radio network controller (RNC), of providing high speed downlink packet access (HSDPA) services, the method comprising:
transmitting a first Iub signal to a Node B indicating a maximum transmit power level for all channel codes transmitted by the Node B;
transmitting a second Iub signal to the Node B indicating a maximum transmit power level for high speed downlink shared channel (HS-DSCH) and high speed shared control channel (HS-SCCH) codes of the Node B for each time slot of a plurality of time slots in a time division duplex frame; and
transmitting an Iub signal to the Node-B indicating a number of codes for HS-DSCH transmission.

* * * * *